UNITED STATES PATENT OFFICE.

JOHN H. PALMER, OF WEST NEW BRIGHTON, NEW YORK.

PAINT.

SPECIFICATION forming part of Letters Patent No. 350,765, dated October 12, 1886.

Application filed February 26, 1886. Serial No. 193,337. (Specimens.)

*To all whom it may concern:*

Be it known that I, JOHN HENRY PALMER, of West New Brighton, in the county of Richmond and State of New York, have invented a new and Improved Paint, of which the following is a full, clear, and exact description.

Prior to my invention the matter remaining after the usual process employed for purifying the oil extracted from flaxseed has been of little or no value, as this matter or residuum was considered as so much waste material; but I have discovered that by combining this residuum with a certain amount of linseed-oil a brilliant as well as a durable paint may be produced.

My composition consists of the following ingredients combined in the proportions stated: Residuum of linseed-oil, three parts; linseed-oil, one part. These ingredients are to be thoroughly mixed and applied as any ordinary form of paint is applied, the paint, if necessary, being thinned with turpentine.

Having thus described my invention, what I claim as new, and desire to secure by Letters Patent, is—

The herein-described composition of matter constituting a paint consisting of the residuum of linseed-oil resulting from the purification of such oil, combined with linseed-oil, in proportions substantially as specified.

JOHN H. PALMER.

Witnesses:
EDWARD KENT, Jr.,
C. SEDGWICK.